US008108879B1

(12) United States Patent
Garlick et al.

(10) Patent No.: US 8,108,879 B1
(45) Date of Patent: Jan. 31, 2012

(54) METHOD AND APPARATUS FOR CONTEXT SWITCHING OF MULTIPLE ENGINES

(75) Inventors: Lincoln G. Garlick, Santa Clara, CA (US); Dennis K. Ma, San Jose, CA (US); Paolo E. Sabella, San Francisco, CA (US); David W. Nuechterlein, Longmont, CO (US)

(73) Assignee: NVIDIA Corporation, Santa Clara, CA (US)

( * ) Notice: Subject to any disclaimer, the term of this patent is extended or adjusted under 35 U.S.C. 154(b) by 1465 days.

(21) Appl. No.: 11/553,901

(22) Filed: Oct. 27, 2006

(51) Int. Cl.
*G06F 9/46* (2006.01)
(52) U.S. Cl. .......................................... 718/108; 712/43
(58) Field of Classification Search .................... 718/108
See application file for complete search history.

(56) References Cited

U.S. PATENT DOCUMENTS

| 6,195,676 | B1 * | 2/2001 | Spix et al. .................. 718/107 |
| 6,374,286 | B1 * | 4/2002 | Gee et al. .................... 718/108 |
| 7,444,641 | B1 * | 10/2008 | Diepstraten et al. .......... 718/107 |
| 2007/0124736 | A1 * | 5/2007 | Gabor et al. .................. 718/108 |
| 2008/0184257 | A1 * | 7/2008 | Olszewski et al. ............ 718/105 |
| 2009/0100250 | A1 * | 4/2009 | Chen et al. ..................... 712/43 |

* cited by examiner

*Primary Examiner* — Diem Cao
(74) *Attorney, Agent, or Firm* — Kilpatrick Townsend & Stockton LLP

(57) ABSTRACT

A processor having multiple independent engines can concurrently support a number of independent processes or operation contexts. The processor can independently schedule instructions for execution by the engines. The processor can independently switch the operation context that an engine supports. The processor can maintain the integrity of the operations performed and data processed by each engine during a context switch by controlling the manner in which the engine transitions from one operation context to the next. The processor can wait for the engine to complete processing of pipelined instructions of a first context before switching to another context, or the processor can halt the operation of the engine in the midst of one or more instructions to allow the engine to execute instructions corresponding to another context. The processor can affirmatively verify completion of tasks for a specific operation context.

19 Claims, 5 Drawing Sheets

METHOD AND APPARATUS FOR CONTEXT SWITCHING OF MULTIPLE ENGINES

BACKGROUND

The increased density of transistors in an integrated circuit permits a processor to support immense processing capabilities. Computing systems take advantage of the tremendous processing capabilities by enabling execution of complex applications.

An individual application executing on a processor may consume substantial processing resources, but may not fully consume the capabilities of a processor. The spare processing resources can be used to support additional applications. The processor may allow processing supporting multiple applications to occur in parallel when the requested processor resources are distinct. The processor can selectively schedule resources that are shared by the multiple applications.

The processor can time slice shared resources in a manner that permits each accessing application a fair opportunity to utilize the shared resource. The processor needs to implement some manner of allocating and tracking the utilization of resources within the processor in order to effectively manage the sharing of resources.

The processor may not have the ability to share resources on the basis of time alone, as the utilization of shared resources may be unequally split between applications. A time period allocated to a first application may be insufficient to completely process a required task, while the same time allocation to a second resource may result in idle time for the resource. Additionally, allocating shared resources based on a set number of instructions may be an unfair allocation of resources, as the time to execute some processor instructions may vary based on prior instructions or data sets operated on. The time needed to execute a set number of instructions corresponding to a first application may not support a latency requirement that needs to be satisfied by a second application sharing the resource.

A processor having the ability to support multiple applications and having the ability to share resources among multiple applications needs to be able to manage the sharing of resources between the multiple applications. The processor needs to support some level of fairness in allocating access to the shared resources, while ensuring that the sharing of resources does not result in the introduction of errors or other adverse effects into other applications sharing the resources.

SUMMARY

A processor having multiple independent engines can concurrently support a number of independent processes or operation contexts. The processor can independently schedule instructions for execution by the engines. The processor can independently switch the operation context that an engine supports. The processor can maintain the integrity of the operations performed and data processed by each engine during a context switch by controlling the manner in which the engine transitions from one operation context to the next. The processor can wait for the engine to complete processing of pipelined instructions of a first context before switching to another context, or the processor can halt the operation of the engine in the midst of one or more instructions to allow the engine to execute instructions corresponding to another context. The processor can affirmatively verify completion of tasks for a specific operation context.

Aspects of the invention include method of context switching resources within a processor. The method includes determining a context switching mode corresponding to a schedulable resource within the processor, and context switching the schedulable resource based in part on the context switching mode.

Aspects of the invention include a method of context switching resources within a processor. The method includes determining a plurality of channels requesting resources from the processor, granting access to the processor to a first channel, determining an identity of a first set of one or more hardware engines within the processor to support the first channel, scheduling instructions from the first channel to each engine from the first set of one or more hardware engines, granting access to the processor to a second channel, determining an identity of a second set of one or more hardware engines within the processor to support the second channel, determining one or more shared hardware engines found with the first set and within the second set, determining a context switching mode supported by each of the one or more shared hardware engines, and context switching each of the one or more shared hardware engines to a context corresponding to the second channel based on the supported context switching mode.

Aspects of the invention include a method of determining process completion by one of a plurality of context switchable resources within a processor. The method includes determining an identity of a hardware engine within the processor to monitor for completion of processing, determining a context switching mode supported by the hardware engine, and determining a processing state based in part on the context switching mode.

Aspects of the invention includes an apparatus configured to context switch resources within a processor. The apparatus includes a resource scheduler configured to receive one or more instructions from a channel corresponding to one or more independently schedulable resources within the processor, a resource context map configured to store information representative of a context switching mode supported by each of the one or more independently schedulable resources, and a context controller configured to determine a context corresponding to the channel, determine from the resource context map the context switching mode supported by each of the one or more independently schedulable resources, and context switch a resource for which a present context does not correspond to the context corresponding to the channel based on the context switching mode.

Aspects of the invention includes an apparatus configured to context switch resources within a processor. The apparatus includes means for determining a context switching mode corresponding to a schedulable resource within the processor, and means for context switching the schedulable resource based in part on the context switching mode.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Figure 1:
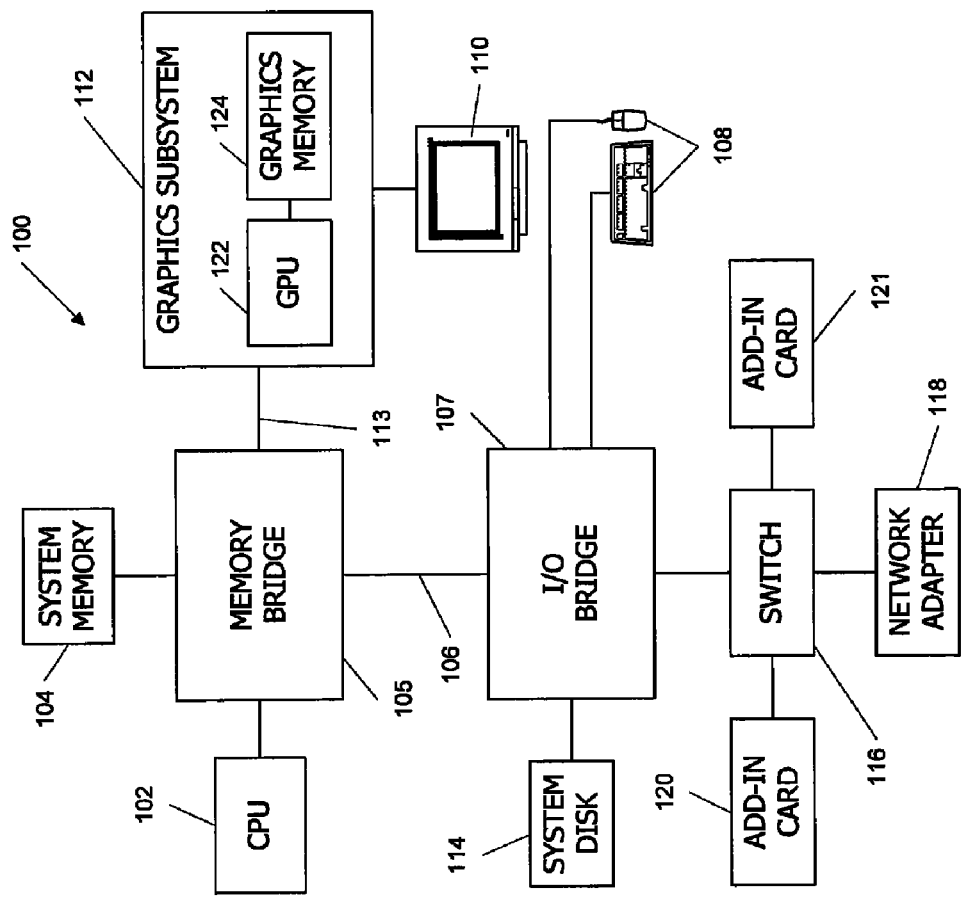
FIG. 1 is a simplified functional block diagram of an embodiment of a computer system.

A processor having multiple independently schedulable resources and methods of managing independently schedulable resources in a processor are described herein. A processor can include multiple independently schedulable engines that are optimized to perform a variety of tasks. Each engine is hardware, software, or combination of hardware and software that is configured to efficiently perform a processing task, substantially independent of a main processing unit or core.

An engine manager within the processor can manage multiple applications requesting use of the engines and can schedule the allocation of one or more of the engines to each application. Each application interfaces with the engine manager via a distinct channel. A channel refers to an application, driver, and the like that access the processor and requests resources.

The engine manager schedules instructions from an active channel to the desired engines within the processor. The engine manager can, for example, schedule instructions to a pipeline for each of the engines. Once the engine manager schedules one or more instructions to one or more engines within the processor, the engine manager can deactivate the channel and selectively activate another channel. The engine manager can then schedule one or more instructions from the newly active channel to one or more engines.

Each engine can be configured to support a particular channel, and when configured to support the particular channel can be referred to as allocated to or supporting a particular context. The context refers to the channel and application from which the instructions originated. The combination of pipelined instructions and independently schedulable engines permits an engine to support a particular context while the engine manager is scheduling instructions from a channel not associated with the context. Therefore, there need not be a one-to-one correspondence between the active channel and the context of an engine.

The various channels can require one or more of the same engines to perform similar tasks. The engine manager selectively controls the manner in which the engine resources are allocated to the channels and effectively controls the context that the engine is running. The engine manager switches or otherwise reconfigures an engine when switching the context that the engine supports.

The engine manager can context switch the engines in one of two ways. In a first mode, referred to as Wait-For-Idle (WFI), the engine manager allows the engine to complete the instructions in the pipeline before context switching the engine. In a second mode, the engine manager does not wait for the engine to complete the instructions in the pipeline. Instead, the engine manager determines a convenient processing point at which the engine is context switched. The unexecuted instructions in the pipeline and any intermediate data and states are stored, such that the engine can resume processing from the point at which the context switch occurred when the context of the engine is returned to the context that was stopped. This mode of context switching is referred to as Halt.

The engine manager needs to accurately determine when an engine has completed the processing for a particular context because of the potential for a lack of correspondence between the active channel and the context of an engine and the possibility of switching a context of an engine before it has completed all of the processing associated with instructions loaded into a pipeline. Each engine can set an idle state indicator that informs the engine manager that it has completed execution of all of the pipelined instructions.

The engine manager can examine the idle state indicator to determine that the corresponding engine has completed processing and has returned to an idle state. The engine manager needs to verify that the idle state corresponds to a particular context of interest. The engine manager verifies correspondence of the idle state indicator to the context to ensure that the idle state indicator does not correspond to a context that resulted from a context switch.

The engine manager can examine the idle state indicator for those engines implementing WFI mode context switching. If the idle state indicator does not indicate an idle state, the engine manager can examine the context of the engine to determine if a context switch has occurred. An engine implementing WFI mode context switching completes execution of all pipelined instructions from a first context before switching to a second context. Therefore, if a WFI mode engine idle state indicator is active, indicating the engine is in an idle state, the engine has completed processing of all pipelined instructions, regardless of the number of context switches that may have occurred.

Similarly, if an engine implementing WFI mode does not indicate an idle state, but the context of the engine is different from the context that the engine manager is verifying, the processing of any earlier contexts is complete. The completion can be inferred because the engine operating in WFI mode completes processing of all pipelined instruction prior to initiating the context switch.

If an engine implements Halt mode context switching, the engine manager verifies that the context is accurate before verifying the state of the idle state indicator. In one embodiment, the engine manager loads the context of interest prior to examining the state of the idle state indicator. The engine manager ensures that the idle state indicator corresponds to the context of interest. In another embodiment, the engine manager actively tracks the context of the engine and tracks the corresponding idle state indicator. The engine manager can thus determine whether a context switch occurred, and if a context switch has not occurred, can merely examine the state of the idle state indicator. The engine manager can reload the engine with the context of interest prior to examining the idle state indicator if the engine manager determines that the context of the engine does not match the context of interest.

The multiple engines and the different context switching modes allows the processor to efficiently and fairly time slice the processor resources. The engine manager can determine the status of any engine relative to a particular context by determining a context switching mode of the engine and determining a state of an idle state indicator based on the context switching mode.

The description of a processor having multiple resources that can each be independently scheduled for operation in one of multiple contexts and the ability to switch the context of each of the resources is described herein in relation to a graphics processor operating in conjunction with a general purpose processor. However, the apparatus and methods for implementing multiple context switching modes and determining the completion of processing in a particular context is not limited to a particular processor type, but can be implemented in a variety of processor types.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a Hyper-Transport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Figure 2:
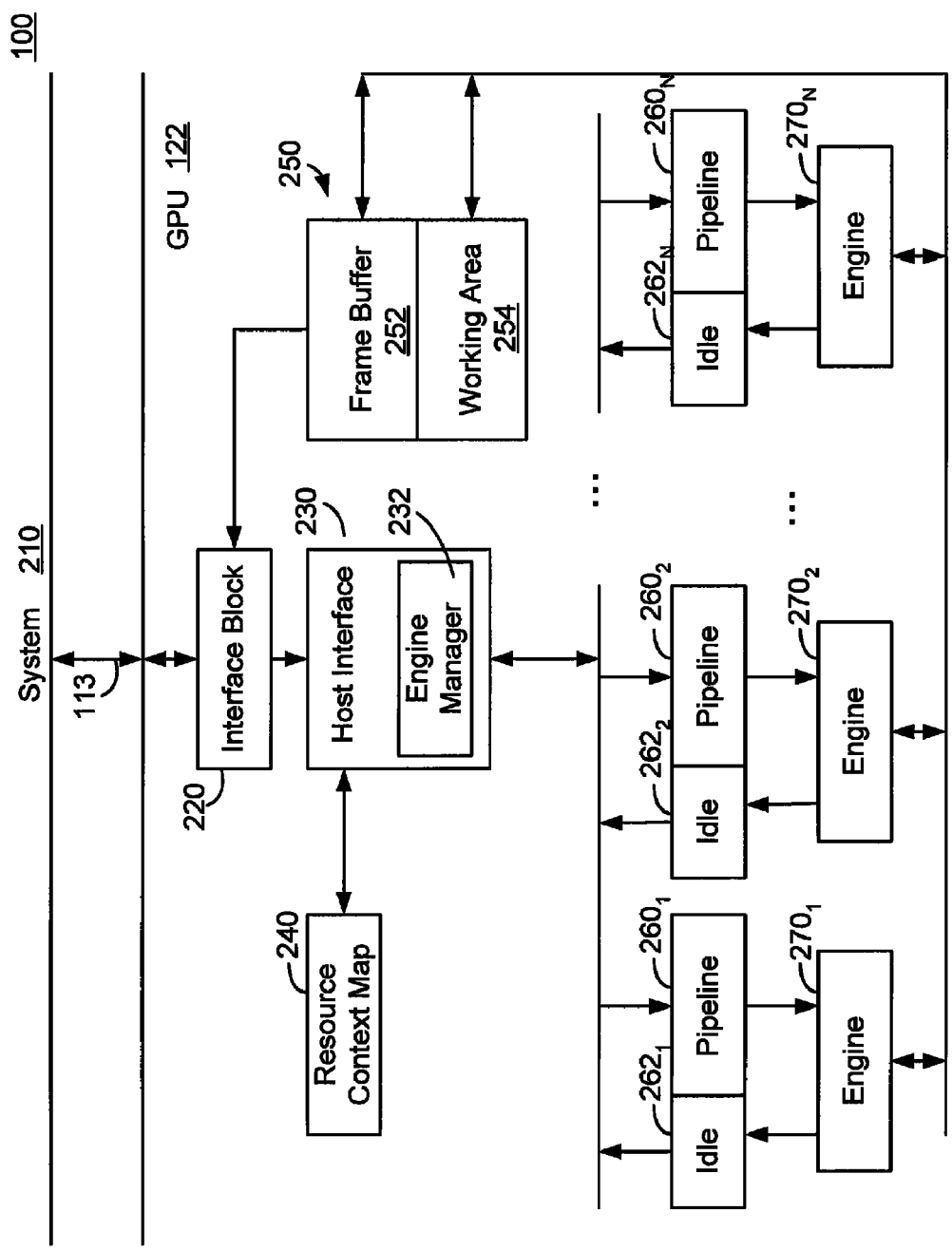
FIG. 2 is a simplified functional block diagram of an embodiment of a processor with multiple engines.

FIG. 2 is a simplified functional block diagram of a portion of the computer system of FIG. 1. The functional block diagram provides additional details into the GPU related to context switching.

The computer system 100 includes a system 210 interfacing with a GPU 122 via an interface bus 113. The system 210 can include, for example, a general purpose processor executing one or more applications from memory. The system can also include, for example, one or more devices that are configured to access the GPU 122 independent of the general purpose processor.

Each one of the applications or devices in the system can be the source of one or more channels requesting processing resources from the GPU 122. Each channel access the GPU 122 using the interface 113. The GPU 122 includes an interface block 220 that is configured to convert information to and from the interface bus 113 to an from, respectively, the communications protocol used on the interface bus 113.

The GPU 122 communicates with and services the various channels in a time sliced manner. However, GPU 122 can concurrently process data and information from multiple channels. A host interface block 230, alternatively referred to by the shorthand term "host", controls the communications with the system 210 and controls the time slicing of channel access.

For each active channel, the host interface block 230 determines what resources within the GPU 122 are required or otherwise requested. The host interface block 230 determines which of multiple substantially independent GPU resources to allocate to the channel. In the embodiment shown in FIG. 2, the independent GPU resources are depicted as engines, e.g. $270_1$. However, the GPU resources are not limited to engines, but can be some other independently allocatable resources.

The host interface block 230 determines the desired resources for a particular active channel and includes an engine manager 234 that is configured to schedule instructions from the active channels to the various engines. The engine manager 234 also controls the context of each of the engines and can switch the context of an engine. The engine manager 234 also can determine whether a particular engine has completed the tasks or instructions assigned to it corresponding to a particular context.

The GPU 122 of FIG. 2 depicts each engine, e.g. $270_1$, as distinct. However, the GPU 122 is not limited to such an architecture and some engines can share one or more resources, provided each engine is independently allocatable.

Each engine is hardware, software, or combination of hardware and software that is configured to perform a processing task, substantially independent of a general processing unit. For example, an engine can be configured to graphics processing, video processing, 3-D rendering, MPEG acceleration, HD Video acceleration, and the like, or some other processing. An engine need not be limited to performing tasks that are related to graphics or display processing. For example, an engine can be configured to perform Fast Fourier Transform (FFT) processing, encryption, encoding, decoding, and the like, or some other processing.

The GPU 122 includes multiple engines $270_1$-$270_N$ that are independently allocatable.

Typically, each engine, e.g. $270_1$ performs a processing function that is distinct from the functions of all of the other engines. However, in some embodiments, the GPU 122 can implement more than one engine that performs substantially the same function.

The engine manager 234 determines the context of each of the engines that are to be scheduled with instructions from the active channel. Those engines that are currently supporting contexts that correspond to the active channel can be scheduled with no changes of context. Those engines that are currently supporting contexts that do not correspond to the active channel will be context switched to match the active channel prior to scheduling instructions to the engine.

The engine manager 234 can access a resource context map 240 that stores the contexts of the various engines and that can be used to store the state information used to context switch an engine to a particular context. The resource context map 240 can also store a context switching mode of each of the engines.

The engine manager 234 schedules an engine, e.g. $270_1$, by writing an instruction to a pipeline buffer, e.g. $260_1$, corresponding to the engine $270_1$. The engine manager 234 can continue to route instructions to a pipeline buffer so long as the buffer is not full.

In the embodiment of FIG. 2 each of the engines, e.g. $270_1$, has a corresponding pipeline buffer, e.g. $260_1$. However, the GPU 122 is not limited to having a distinct pipeline buffer, alternatively referred to as a pipeline, for each of the engines, and may have some other pipeline buffer architecture. For example, the GPU 122 can include a single FIFO buffer of scheduled instructions, and each instruction in the FIFO buffer can have some identifier or indicator that associates the instruction with an engine.

An engine, e.g. $270_1$, executes each instruction in its associated pipeline buffer $260_1$. The engine $270_1$ can utilize a working space 254 in memory 250 when executing the pipelined instructions. The engine $270_1$ can output processed data or information to a frame buffer 252 portion of the memory 250. The information stored in the frame buffer 252 can be supplied to the interface block 220 and output from the GPU 122 to a destination device or application in the system 210. The engine $270_1$ asserts an idle indication or flag in an associated idle status indicator $262_1$ or otherwise indicates that the engine $270_1$ has transitioned to an idle state when the engine $270_1$ has emptied the pipeline $260_1$ and completed processing of the last instruction.

The engine manager 234 examines the current context of each engine that is to be scheduled, to determine whether the context of the engine needs to be switched prior to routing instructions to the associated pipeline. The engine manager 234 can receive one or more instructions from an active channel corresponding to a particular context. The engine manager 234 or some other portion of the host interface block 230 can determine which of the engines will execute the instructions. The engine manager 234 can examine the resource context map 240 to determine if the present context of the allocated engines correspond to the channel. That is, the engine manager determines, based on the identity of the active channel and the information in the resource context map 240, whether any of the engines are to be context switched.

If the engine manager 234 determines that an engine does not require context switching, the engine manager 234 routes instructions to the corresponding pipeline. However, if the present context of an engine does not correspond to the active channel, the engine manager 234 context switches the engine prior to routing instruction from the active channel to the engine.

The engine manager 234 examines the resource context map to determine which context switching mode a particular engine, for example $270_1$, supports. For example, the engine $270_1$ can support WFI mode, Halt mode, or can be selectively programmed to one of WFI or Halt mode. In one embodiment, each engine can support one of WFI mode or Halt mode, and the resource context map 240 keeps a table or list of the available engines and their supported context switching modes. In another embodiment, some or all of the engines can support multiple context switching modes, and the resource context map 240 keeps a table or list of the engines, ability to support context modes, and active context switching mode.

The engine manager 234 can select a context switching mode based on instruction latency constraints, convenience, or some other information for those engines that have controllable context switching modes. For embodiments or engines having static context switching modes, the engine manager 234 determines the supported context switching mode.

If the engine manager 234 determines that an engine $270_1$ supports WFI style switching, the engine manager 234 can context switch the engine $270_1$ at a time that coincides with the first instruction associated with the new context. If the engine manager 234 determines that an engine $270_1$ supports Halt mode of context switching, the engine manager 234 determines a convenient time to halt processing of the instructions from the present context.

During a Halt style context switch operation, the engine manager 234 temporarily terminate processing of the present context prior to execution of all of the pipelined instructions for that context. The engine manager 234 can terminate the processing at the completion of any instruction or can terminate processing during processing of an instruction.

In one embodiment, the engine manager 234 terminates processing by an engine immediately upon initiating a Halt style context switch. The engine manager 234 stores all relevant data and information that is required to complete processing of the context upon resumption of the context. The engine manager 234 can, for example, store any intermediate values, engine states, and any other desired data or information. The engine manager 234 can store the intermediate information in a portion of memory 250 or in locations of the resource context map 240.

In another embodiment, the engine manager 234 does not terminate the processing of the engine immediately upon initiating a context switch. Instead, the engine manager 234 allows the engine to continue processing until a convenient stopping point is reached. The convenient stopping point can be determined based on the number of intermediate values to be stored for the terminated context. For example, the engine manager 234 can wait until all outstanding memory requests made by the engine have been returned, or can wait until a particular processing operation has completed. The actual termination state can be based on a variety of factors and knowledge relating to the particular instructions being executed by the engine.

After temporarily terminating the processing of the context by the engine and storing the data and state information needed to resume processing, the engine manager 234 can configure the engine for the new context and route the instructions for the newly active context to the appropriate pipeline. Upon completion of the processing of the instructions for the newly active context, the engine manager 234 may resume processing of the halted context or may schedule engine for some other context.

The host interface block 230 and engine manager 234 may need to verify completion of processing of instructions corresponding to a particular context. For example, the engine manager 234 may have instructions from an active channel to schedule to multiple engines, but the results from the first engine are needed in order to receive proper results from the second engine. That is, the instruction to be scheduled to the second engine may rely on the results from processing performed in the first engine.

The ability to context switch the various engines and independently schedule the various engines complicates verifying the completion of processing. Although each engine asserts an idle state indicator when all of the pipelined instructions have been processed, the possibility that the engine was context switched raises the possibility that the asserted idle state indicator indicates the completion of processing of instruction for a different context.

The engine manager 234 implements verification procedures that differ based on the context switching mode of the engine. The engine manager 234 initially determines the context switching mode supported by the engine. If the engine manager 234 determines that the engine supports WFI mode context switching, the engine manager 234 can directly examine the state of the idle state indicator to determine whether processing is complete.

In WFI context switching, the engine processes all pipelined instructions for a first context prior to switching to a second context. Thus, the engine processes the context through to idle state prior to the context switch. Thus, an asserted idle state indication informs the engine manager that all previously scheduled instructions, regardless of associated context, have been executed to completion.

If the engine manager 234 determines that the idle state indicator is not asserted for a WFI context switching engine, the processing may not be complete, or the engine may be processing instructions corresponding to a different context. The engine manager 234 can verify completion of the instructions for a previously scheduled context by comparing the present context against the context for which completion of processing is being verified. If the two match, and the idle state indicator is not asserted, the processing has not finished. However, if the current context of the engine does not match the context for which completion of processing is being verified, the engine manager 234 can determine that processing has completed. This is due to the manner in which the WFI engine processes context switches. A context switch does not occur until processing completes to idle state. Thus, a change in contexts indicates completion of earlier processing. In an embodiment where the engine manager 234 does not have the ability to determine the active context of an engine, the engine manager 234 can wait until the engine asserts the idle state indicator.

If the engine manager 234 determines that an engine supports Halt mode context switching, the engine manager 234 cannot merely examine the idle state indicator because the context may have switched. An asserted idle state indicator may indicate completion of a context that is different from the context of interest. To ensure that the idle state indicator corresponds to the appropriate context, the engine manager 234 reconfigures the engine to the context of interest prior to examining the idle state indicator. Thus, for a Halt mode engine, the engine manager 234 context switches the engine to the context of interest prior to examining the idle state indicator. If the idle state indicator is asserted following the context switch, the engine manager 234 can be assured that it represents completion of processing of the context of interest.

Figure 3:
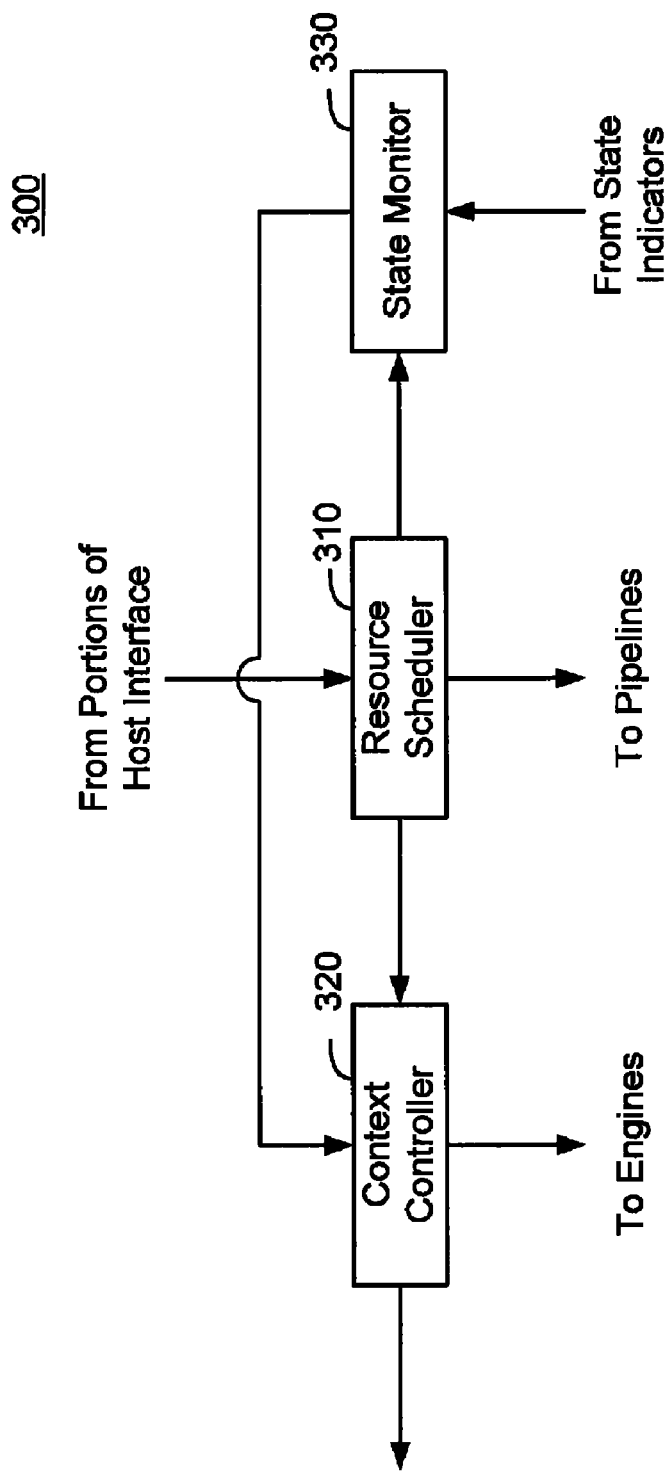
FIG. 3 is a simplified functional block diagram of an embodiment of a context switching manager.

FIG. 3 is a simplified functional block diagram of an embodiment of a context switching manager 300. The context switching manager 300 can be, for example, the engine manager of the embodiment of FIG. 2.

The context switching manager 300 includes a resource scheduler 310, context controller 320 and state monitor 330. The resource scheduler is configured to receive the one or more instructions for the engines and route the instruction to the appropriate resource instruction pipeline. The resource scheduler 310 can couple the identity of the scheduled resources to the context controller 320. For example, the resource scheduler 310 can be configured to couple the identity of one or more engines to the context controller 320.

The context controller 320 is configured to configure the scheduled resources to the appropriate contexts. For example, the context controller 320 can determine or otherwise receive an indication of the context associated with the instructions. The context controller 320 can be configured to access a configuration map to determine the states and data that is set within a resource to switch a resource to support a particular context.

The context controller 320 can determine from the configuration or context map whether the context switching mode supported by a particular scheduled resource. For example, the context controller 320 can determine that a particular engine supports WFI context switching and can determine that a distinct engine supports Halt context switching.

The context controller 320 determines the manner in which the resource is context switched. For example, the context controller determines the stopping point and the states, data, and information that need to stored for a Halt context switch to enable the processing to resume from the halted state.

A state monitor 330 coupled to the resource scheduler 310 determines when the processing state of a resource is to be monitored or otherwise verified. For example, the state monitor 320 can determine, based on the resource scheduler 310, that a particular engine is to be queried to examine whether the engine completed processing of instructions associated with a particular context.

The state monitor 330 communicates with the context controller 320 to determine which context switching mode is supported by the resource of interest. The state monitor 330 determines completion of processing by the resource of interest based on the context switching mode.

For example, if an engine of interest supports WFI context switching, the state monitor 330 can determine the state of the engine by directly examining an idle state indicator associated with the engine. An asserted idle state indication indicates that the processing is complete.

If the state monitor 330 determines from the context controller 320 that an engine of interest supports Halt context switching, the state monitor 330 instructs the context controller 320 to context switch the engine to the context of interest. The state monitor 330 can then examine the idle state indicator to determine whether the engine has completed processing within the context of interest.

Figure 4:
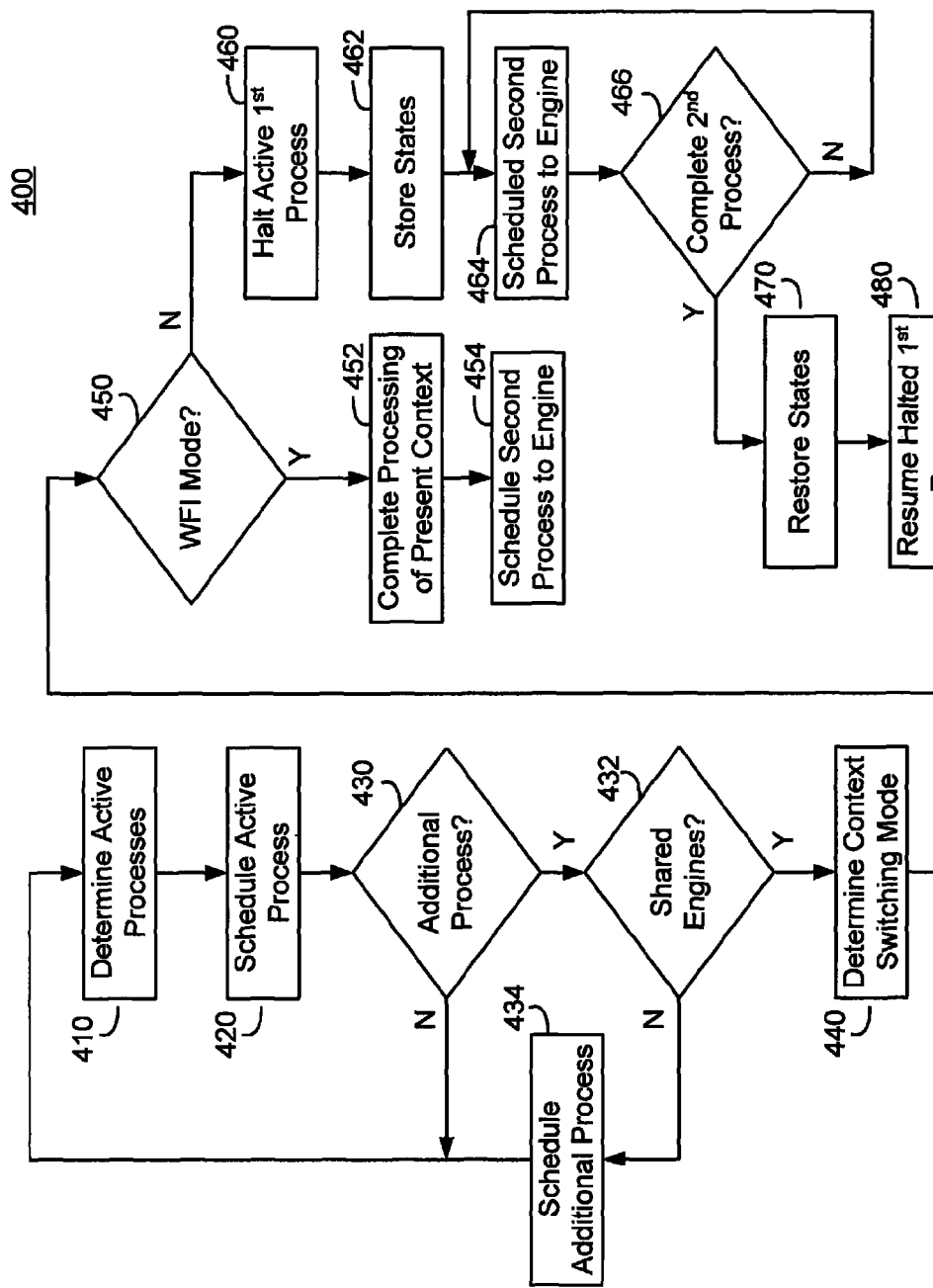
FIG. 4 is a simplified flowchart of an embodiment of a method of context switching.

FIG. 4 is a simplified flowchart of an embodiment of a method 400 of context switching. The method 400 can be executed, for example, by the GPU of FIG. 2. In the method 400 embodiment of FIG. 4, the GPU processes two channels in at least one shared engine. The GPU is configured to automatically return to halted contexts upon completion of the context that interrupted the processing. However, such automatic restoration of the halted context is not a requirement of all embodiments, and a particular context may remain halted until explicitly restored.

The method 400 begins at block 410 where the GPU determines if there is one or more active processes, referred to as channels, and which of the channels is presently active. For example, one or more applications executing on a general purpose processor can generate one or more channels that each access the GPU and utilize the GPU for processing. Similarly, one or more devices in communication with the GPU can be the source of a channel with the GPU.

The GPU proceeds to block 420, determines which of the GPU resources is requested by the channel, and schedules a first channel to the one or more engines or other resources needed to support the channel. The GPU proceeds to decision block 430 to determine if an additional channel exists. If not, the GPU returns to block 410 to continue to determine the number of channels desiring access to the GPU. If another channel desires GPU resources, the GPU operates to time slice the channel access to the GPU.

The GPU proceeds from decision block 430 to decision block 432, where the GPU time slices to the additional channel and determines if the second or additional channel desires one or more of the same engines or resources already allocated to a prior channel. The GPU allows the multiple engines to concurrently support independent channels. Therefore, if there is no overlap in the desired resources, the GPU proceeds from decision block 432 to block 434, where the GPU schedules the instructions from the second channel to the resources within the GPU.

If the GPU, at decision block 432, determines that one or more engines needs to be shared between multiple contexts, the GPU proceeds to block 440. At block 440 the GPU determines which context switching mode is supported by each of the engines that need to be context switched. The GPU can, for example, look up the supported context switching mode from a table in a context map or some other configuration map, table, listing, or record. Alternatively, the GPU may query each engine to determine its context switching mode.

After determining a context switching mode for an engine to be context switched, the GPU proceeds to decision block where the GPU determines if the context switching mode is Wait-For-Idle (WFI) mode. If so, the GPU proceeds to block 452 and completes processing of the previous context or otherwise permits processing of the previous context to proceed to completion. The GPU proceeds to block 454 and schedules the context switching and second channel instructions to occur after the last instruction corresponding to the previous context. The GPU can, for example, schedule the commands for context switching and instructions to a pipeline buffer associated with the engine.

If the GPU determines at decision block 450 that the context switching mode supported by the engine is not WFI, the context switching mode is Halt mode. In the method 400 of FIG. 4, each engine supports only one of two possible context switching modes. An engine may support more than two context switching modes in other embodiments.

The GPU proceeds to block 460 to context switch the engine using a process that supports the Halt mode. The GPU determines a stopping point that may occur prior to the execution of all instructions for the previous context. The GPU then halts operation of the context by the engine.

The GPU proceeds to block 462 and stores the states, data, and information related to the halted context such that the processing of the halted context can be resumed at a later time. The GPU proceeds to block 464, configures the engine for the new context and schedules the instructions corresponding to the new context.

The GPU proceeds to decision block 466 and determines if the processing on the new context is complete. The GPU can, for example, poll an idle state indicator to determine when the processing of the new context completes.

If the processing of the context is not complete and requires additional instructions, the GPU returns to block 464 to continue to schedule instructions to the engine. If the GPU determines at decision block 466 that the engine has completed processing of the context, the GPU proceeds to block 470. At block 470 the GPU restores the states, information, and data from the halted process. The GPU proceeds to block 480 and resumes the processing of the halted process from the point at which it was halted.

Figure 5:
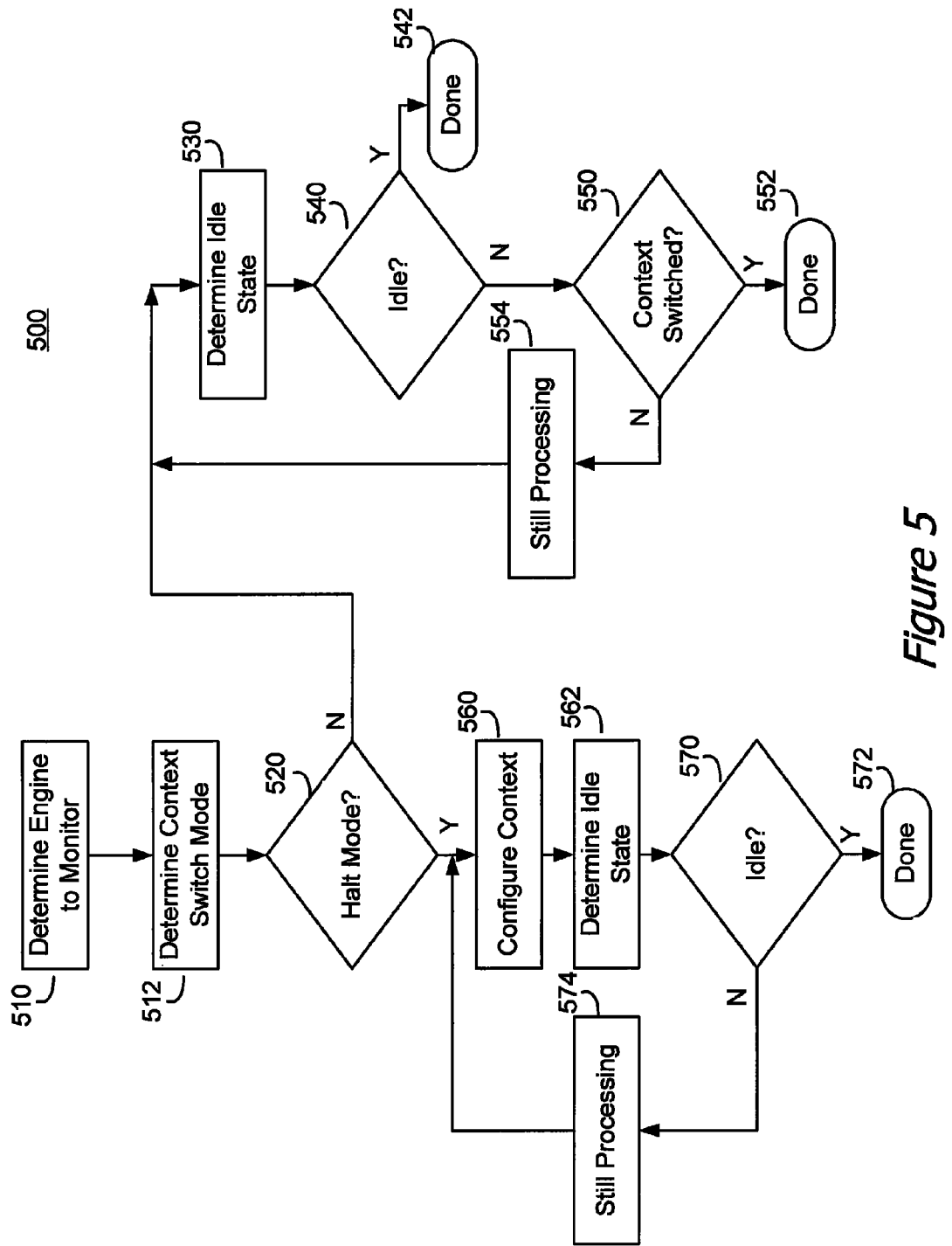
FIG. 5 is a simplified flowchart of an embodiment of a method of verifying completion of a task by an engine.

FIG. 5 is a simplified flowchart of an embodiment of a method 500 of verifying completion of a task by an engine. The method 500 can be executed by a GPU or some other processor implementing context switching of allocatable resources. The method 500 permits the GPU to accurately determine when an engine completes a processing of a context in the presence of context switching.

The method 500 beings at block 510 where the GPU determines the desire or need to determine the processing status of an engine with respect to a particular context. The GPU may, for example, need to know the processing status of a first engine prior to scheduling processing of a second engine.

After determining the identity of the engine to monitor, the GPU proceeds to block 512 to determine the mode of context switching supported by the engine. The GPU can look up the information or can query the engine for the information.

The GPU proceeds to decision block 520 and checks to see if the context switching mode supported by the engine is Halt mode. If not, the GPU can assume that WFI is the supported context switching mode. The GPU proceeds to block 530 and determines the idle state of the engine by examining, reading, or polling, or otherwise determining the state of an idle state indicator.

The GPU proceeds to decision block 540 to determine if the idle state indicator indicates the engine is in an idle state. If so, the GPU proceeds to block 542 where the method 500 is done. The GPU affirmatively verifies that the engine has completed processing of the instructions for the context.

If the GPU determines that the idle state indicator is not asserted, the GPU proceeds from decision block 540 to decision block 550. At decision block 550, the GPU determines if the engine was context switched. In some embodiments, the GPU can determine the occurrence of a context switch by examining a state map a context history, or by some other manner. If the GPU determines that the context of the engine has switched since the instructions of interest were scheduled, the GPU can verify that the WFI engine has completed processing of the context and the GPU proceeds to block 552 and is done.

If the GPU, at decision block 550, determines that the context has not switched, or that the active context corresponds to the context of interest, the GPU proceeds to block 554. At block 554, the GPU determines that processing of the context is not complete. The GPU returns from block 554 to block 530 to continue monitoring the idle state.

If the GPU determines at decision block 520 that the engine supports halt mode context switching, the GPU proceeds from decision block 520 to block 560 and configures the engine with the context of interest. That is, regardless of the present context of the engine, the GPU context switches the engine to the context of interest.

The GPU proceeds to block 562 and determines the idle state of the engine, for example, by examining an idle state indicator corresponding to the engine. The GPU proceeds to decision block 570 to determine if the idle state indicator indicates an idle state. If so, the GPU has completed processing of the context, and the GPU proceeds to block 572 and is done.

If the GPU, at decision block 570, determines that the engine is not idle, the GPU proceeds to block 574 where it determines that the engine has not yet completed processing of the context. The GPU proceeds to block 560 to continue monitoring the Halt mode engine for completion of the context processing.

The method illustrated in FIG. 5 represents an embodiment of a method of determining or otherwise verifying completion of a task by a processor resource, such as an engine. Other processors can use other methods to accomplish substantially the same verification.

In another embodiment, any entity, such as the GPU, CPU or context scheduler attempting to determine completion of a task corresponding to a particular context may assume that the context is BUSY, and not yet complete, any time that the engine is operating on another context. The verifying entity can wait until the GPU schedules the engine for the context before determining whether the processing of the context has completed.

For example, the GPU can determine completion of processing for a target context in an engine by waiting for the target context to be scheduled to the engine and then verifying an idle state corresponding to the engine. The GPU determines that the engine is BUSY if the engine is not scheduled for the target context or if the engine does not return an asserted idle state indicator when scheduled for the target context. In this embodiment, the GPU does not reconfigure an engine for a target context merely to verify its processing state. Instead, the GPU waits for the target context to be scheduled before attempting to verify a processing state.

In another embodiment, the GPU may include one or more registers that store the idle state indicator for halted contexts. In this embodiment, an engine reports an idle state upon completion of processing for a context, and the GPU stores the value of the idle state indicator upon halt style context switching of the engine. Then, if the GPU is interested in the processing state of the halted context, the GPU can examine a stored idle state indicator. The GPU can thus verify a processing state of a halted context without waiting for the target context to be switched back into the engine. However, the embodiment utilizes additional hardware resources to store the idle state indicator upon context switching.

Apparatus and methods are described herein for implementing multiple independent resources supporting distinct context switching modes. The apparatus can initiate context switching of one or more resources using an associated context switching mode. The apparatus can also determine whether a particular engine has completed processing of a context based on the context switching mode supported by the resource.

The various illustrative logical blocks, modules, and circuits described in connection with the embodiments disclosed herein may be implemented or performed with a general purpose processor, a graphics processing unit, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of context switching resources within a processor, the method comprising:
    determining a context switching mode for a schedulable resource within the processor, wherein the context switching mode is one of a plurality of context switching modes comprising a Wait-For-Idle context switching mode where a context for the schedulable resource is not switched until the schedulable resource is idle, and a Halt context switching mode where a context for the schedulable resource may be switched before the schedulable resource is idle; and
    context switching the schedulable resource based in part on the context switching mode.

2. The method of claim 1, further comprising:
   determining a first set of resources corresponding to a first context;
   determining a second set of resources corresponding to a second context; and
   initiating context switching of resources populating both the first set and the second set.

3. The method of claim 1, further comprising determining completion of processing by the schedulable resource based in part on the context switching mode.

4. The method of claim 3, wherein determining completion of processing comprises monitoring an idle state indicator if the schedulable resource is configured for the Wait-For-Idle context switching mode.

5. The method of claim 3, wherein determining completion of processing comprises comparing an active context indicator to a target context, if the schedulable resource is configured for the Wait-For-Idle context switching mode.

6. The method of claim 3, wherein determining completion of processing comprises:
   determining the schedulable resource is configured for the Halt context switching mode;
   context switching the schedulable resource to a desired context; and
   monitoring an idle state indicator.

7. The method of claim 1, wherein the schedulable resource comprises a hardware engine selected from a plurality of independently schedulable hardware engines within the processor.

8. The method of claim 1, wherein determining the context switching mode comprises determining one of the Wait-For-Idle (WFI) mode or the Halt context switching mode corresponding to the schedulable resource.

9. The method of claim 1, wherein context switching the schedulable resource comprises configuring the schedulable resource for an updated context following a final instruction for the present context if the context switching mode comprises the Wait-For-Idle mode.

10. The method of claim 1, wherein context switching the schedulable resource comprises:
    halting processing of a present context prior to processing of all scheduled instructions; and
    storing a state of the schedulable resource when processing in the schedulable resource is halted, information representing the state sufficient to allow the schedulable resource to resume processing from a point at which the schedulable resource is halted.

11. A method of context switching resources within a processor, the method comprising:
    determining a plurality of channels requesting resources from the processor;
    granting access to the processor to a first channel;
    determining an identity of a first set of one or more hardware engines within the processor to support the first channel;
    scheduling instructions from the first channel to each engine from the first set of one or more hardware engines;
    granting access to the processor to a second channel;
    determining an identity of a second set of one or more hardware engines within the processor to support the second channel;
    determining one or more shared hardware engines found with the first set and within the second set;
    determining a context switching mode for each of the one or more shared hardware engines, wherein the context switching mode is one of a plurality of context switching modes comprising a Wait-For-Idle context switching mode where a context for the schedulable resource is not switched until the schedulable resource is idle, and a Halt context switching mode where a context for the schedulable resource may be switched before the schedulable resource is idle; and
    context switching each of the one or more shared hardware engines to a context corresponding to the second channel based on the supported context switching mode.

12. A method of determining process completion by one of a plurality of context switchable resources within a processor, the method comprising:
    determining an identity of a hardware engine within the processor to monitor for completion of processing;
    determining a context switching mode for the hardware engine, wherein the context switching mode is one of a plurality of context switching modes, and wherein the hardware engine is selectively programmed to have one of the plurality of context switching modes; and
    determining a processing state based in part on the context switching mode,
    wherein the plurality of context switching modes comprises a Wait-For-Idle context switching mode where a context for the schedulable resource is not switched until the schedulable resource is idle, and a Halt context switching mode where a context for the schedulable resource may be switched before the schedulable resource is idle.

13. The method of claim 12, wherein determining the processing state comprises examining an idle state indicator if the hardware engine supports Wait-For-Idle mode of context switching.

14. The method of claim 12, wherein determining the processing state comprises:
    context switching the hardware engine to a desired context; and
    monitoring an idle state indicator.

15. An apparatus configured to context switch resources within a processor, the apparatus comprising:
    a resource scheduler configured to receive one or more instructions from a channel corresponding to one or more independently schedulable resources within the processor;
    a resource context map configured to store information representative of a context switching mode for each of the one or more independently schedulable resources, wherein the context switching mode is one of a plurality of context switching modes;
    an engine manager configured to selectively program the context switching mode for each of the one or more independently schedulable resources; and
    a context controller configured to determine a context corresponding to the channel, determine from the resource context map the context switching mode supported by each of the one or more independently schedulable resources, and context switch a resource for which a present context does not correspond to the context corresponding to the channel based on the context switching mode,
    wherein the one or more independently schedulable resources comprise one or more independently schedulable hardware engines, and
    wherein the resource context map identifies each of the one or more independently schedulable resources as supporting one of Wait-For-Idle mode or Halt mode of context switching.

16. The apparatus of claim 15, wherein the resource scheduler is configured to route each instruction to a corresponding pipeline buffer.

17. The apparatus of claim 15, further comprising a state monitor coupled to the context controller and configured to determine a processing state of each of the one or more independently schedulable resources based on the context switching mode supported.

18. The apparatus of claim 15, wherein the plurality of context switching modes comprises a Wait-For-Idle context switching mode where a context for the schedulable resource is not switched until the schedulable resource is idle, and a Halt context switching where a context for the schedulable resource may be switched before the schedulable resource is idle.

19. An apparatus configured to context switch resources within a processor, the apparatus comprising:

means for determining a context switching mode corresponding to a schedulable resource within the processor, wherein the context switching mode is one of a plurality of context switching modes comprising a Wait-For-Idle context switching mode where a context for the schedulable resource is not switched until the schedulable resource is idle, and a Halt context switching mode where a context for the schedulable resource may be switched before the schedulable resource is idle; and means for context switching the schedulable resource based in part on the context switching mode.

* * * * *